(12) United States Patent
Inohiza (10) Patent No.: US 12,426,072 B2
(45) Date of Patent: Sep. 23, 2025

(54) COMMUNICATION APPARATUS, INFORMATION PROCESSING APPARATUS, CONTROL METHOD, AND COMPUTER-READABLE STORAGE MEDIUM

(71) Applicant: CANON KABUSHIKI KAISHA, Tokyo (JP)

(72) Inventor: Hirohiko Inohiza, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 366 days.

(21) Appl. No.: 17/742,491

(22) Filed: May 12, 2022

(65) Prior Publication Data
US 2022/0272689 A1 Aug. 25, 2022

Related U.S. Application Data

(63) Continuation of application No. PCT/JP2020/042766, filed on Nov. 17, 2020.

(30) Foreign Application Priority Data

Nov. 18, 2019 (JP) .................... 2019-208239

(51) Int. Cl.
*H04W 72/51* (2023.01)
*H04W 72/0453* (2023.01)
(Continued)

(52) U.S. Cl.
CPC ....... *H04W 72/51* (2023.01); *H04W 72/0453* (2013.01); *H04W 80/02* (2013.01); *H04W 84/12* (2013.01)

(58) Field of Classification Search
CPC . H04W 72/51; H04W 72/0453; H04W 80/02; H04W 84/12; H04W 8/24
See application file for complete search history.

(56) References Cited

U.S. PATENT DOCUMENTS 8,811,320 B2 8/2014 Inohiza
10,263,834 B2 4/2019 Inohiza
(Continued)

FOREIGN PATENT DOCUMENTS

CN 1917706 A 2/2007
CN 101536573 A 9/2009
(Continued)

OTHER PUBLICATIONS

International Search Report issued by the Japan Patent Office on Jan. 26, 2021 in corresponding International Application No. PCT/JP2020/042766, with English translation.
(Continued)

*Primary Examiner* — Kan Yuen
(74) *Attorney, Agent, or Firm* — Carter, DeLuca & Farrell LLP (57) ABSTRACT

When a communication apparatus transmits or receives a radio frame compliant with the IEEE 802.11 standard series to or from a partner apparatus in communication, capability information representing an allocation scheme of a frequency resource supported by the apparatus that has transmitted the radio frame is indicated in a MAC (Medium Access Control) frame of the radio frame.

10 Claims, 7 Drawing Sheets

(51) Int. Cl.
*H04W 80/02* (2009.01)
*H04W 84/12* (2009.01)

(56) References Cited

U.S. PATENT DOCUMENTS

| | | | |
|---|---|---|---|
| 2008/0232316 A1* | 9/2008 | Cho | H04W 76/15 |
| 2008/0233966 A1* | 9/2008 | Scheim | H04L 5/0094 |
| | | | 455/509 |
| 2010/0003996 A1* | 1/2010 | Jun | H04W 72/044 |
| | | | 455/450 |
| 2011/0013601 A1* | 1/2011 | Cerasa | H04W 28/26 |
| | | | 370/444 |
| 2011/0194482 A1* | 8/2011 | Ji | H04W 48/08 |
| | | | 370/315 |
| 2015/0071233 A1* | 3/2015 | Wang | H04L 5/0094 |
| 2017/0048719 A1* | 2/2017 | Goto | H04W 16/14 |
| 2017/0048823 A1 | 2/2017 | Bharadwaj | |
| 2017/0181040 A1* | 6/2017 | Chandwani | H04W 72/0453 |
| 2018/0091284 A1* | 3/2018 | Min | H04L 5/1461 |
| 2018/0213379 A1* | 7/2018 | Xiong | H04W 4/70 |
| 2018/0213446 A1 | 7/2018 | Chun | |
| 2019/0268098 A1* | 8/2019 | Chun | H04L 69/22 |
| 2020/0059950 A1* | 2/2020 | Oteri | H04W 74/08 |
| 2020/0336981 A1 | 10/2020 | Inohiza | |
| 2021/0391941 A1 | 12/2021 | Inohiza | |
| 2024/0121067 A1* | 4/2024 | Chen | H04L 5/0005 |

FOREIGN PATENT DOCUMENTS

| | | |
|---|---|---|
| CN | 104853385 A | 8/2015 |
| JP | 2017-108195 A | 6/2017 |
| JP | 2018-050133 A | 3/2018 |
| JP | 2019-118107 A | 7/2019 |
| KR | 10-2005-0055118 A | 6/2005 |

OTHER PUBLICATIONS

Chinese Office Action issued in corresponding CN Patent Application No. 202080078429.6, dated Jul. 27, 2023, with English translation.

Notice of Reasons for Refusal issued by the Japanese Patent Office on Aug. 21, 2023 in corresponding JP Patent Application No. 2019-208239, with English translation.

Korean Office Action issued in corresponding KR Patent Application No. 10-2022-7019410, dated Dec. 9, 2024, with English translation.

Korean Office Action issued in corresponding KR Patent Application No. 10-2022-7019410, dated Aug. 1, 2025, with English translation.

* cited by examiner

Allocation capability element format

| Element ID | Length | Allocation Capability |
|---|---|---|
| 901 | 902 | 903 |

FIG. 10

| BIT | CONTENT |
|---|---|
| 0 | WHETHER DA (Dynamic Allocation) SCHEME CAN BE USED<br>0: DA SCHEME CANNOT BE USED<br>1: DA SCHEME CAN BE USED |
| 1 | WHETHER SA (Static Allocation) SCHEME CAN BE USED<br>0: SA SCHEME CANNOT BE USED<br>1: SA SCHEME CAN BE USED |

COMMUNICATION APPARATUS, INFORMATION PROCESSING APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2020/042766, filed Nov. 17, 2020, which claims the benefit of Japanese Patent Application No. 2019-208239, filed Nov. 18, 2019, both of which are hereby incorporated by reference herein in their entirety.

BACKGROUND OF THE INVENTION

Field of the Invention

The present invention generally relates to a communication apparatus, an information processing apparatus, a control method, and a computer-readable storage medium and, more particularly, to an information processing technique for the allocation of frequency resources in wireless communication.

Background Art

A recent increase in the amount of communicated data has pushed the development of communication techniques such as wireless LAN (Local Area Network). A major communication standard of the wireless LAN is the IEEE (Institute of Electrical and Electronics Engineers) 802.11 standard series. The IEEE 802.11 standard series includes standards such as IEEE 802.11a/b/g/n/ac/ax. For example, the latest IEEE 802.11ax standard standardizes a technique of increasing the communication speed under congestion, in addition to a peak throughput as high as a maximum of 9.6 Giga bits per second (Gbps) using OFDMA (Orthogonal Frequency Division Multiple Access) (see Japanese Patent Laid-Open No. 2018-050133). In the IEEE 802.11ax standard, an AP (Access Point) transmits, to each STA (STAtion), allocation information representing a frequency resource to be allocated to the STA at the time of OFDMA communication. The allocation information can be included in, for example, a trigger frame on the uplink and the PHY (physical layer) header of a data frame on the downlink.

For higher throughput, a task group has been established to develop an IEEE 802.11be standard as a successor standard of IEEE 802.11ax.

In the IEEE 802.11be standard, it is examined to expand the bandwidth up to 320 MHz and expand the number of MIMO (Multi-Input Multi-Output) streams up to 16. Along with the expansion, an increase in the number of STAs that communicate at the same time is predicted, and an efficient frequency resource allocation method needs to be employed to cope with such a situation. However, even if this method is employed, some APs and STAs may not support the method. In this case, the use of the new method may result in poor efficiency.

SUMMARY OF THE INVENTION

The present invention provides a technique capable of efficiently using a plurality of methods for allocating frequency resources.

According to an aspect of the present invention, there is provided a communication apparatus comprising a communication unit configured to transmit or receive a radio frame compliant with the IEEE 802.11 standard series to or from a partner apparatus in communication, wherein capability information representing an allocation scheme of a frequency resource supported by an apparatus that transmits the radio frame is indicated in a MAC (Medium Access Control) frame of the radio frame.

According to another aspect of the present invention, there is provided a communication apparatus comprising a communication unit configured to transmit or receive a radio frame compliant with the IEEE 802.11 standard series to or from a partner apparatus in communication, wherein the radio frame includes information related to allocation of a first Resource Unit (RU) for a specified apparatus and related to allocation of a second RU different from the first RU for the specified apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

Figure 1:
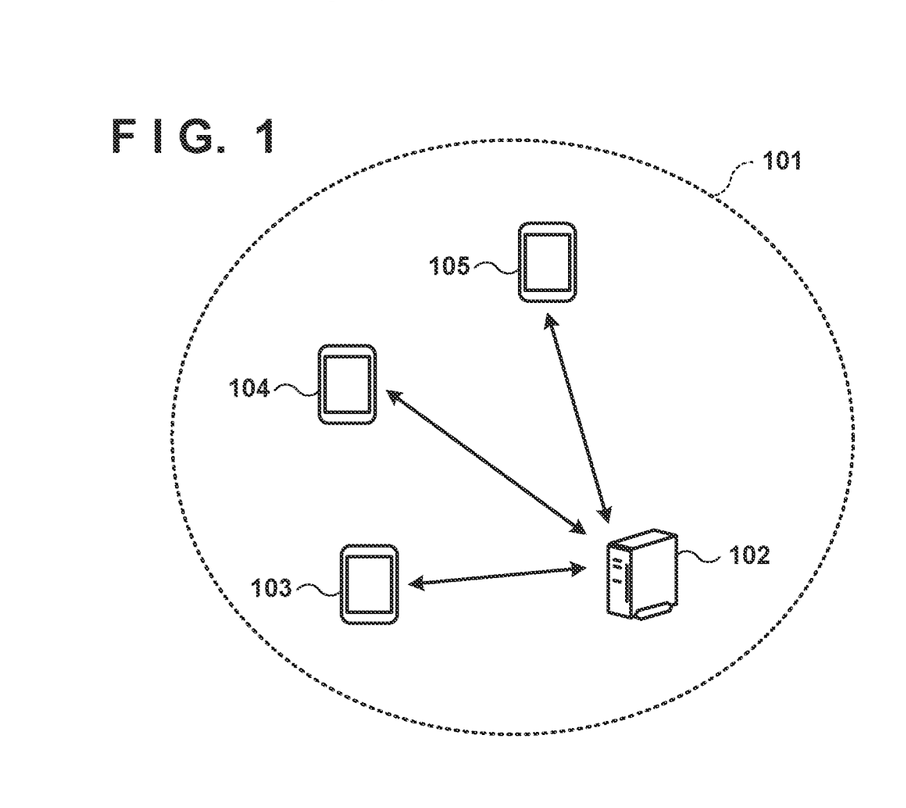
FIG. 1 is a view showing an example of the configuration of a wireless communication network.

FIG. 1 shows an example of the configuration of a wireless communication network according to the embodiment. The wireless communication network is configured including one access point (AP) and three stations (STAs). An AP 102 and STAs 103 to 105 comply with the IEEE 802.11be standard and are configured to be able to execute wireless communications compliant with standards developed before the IEEE 802.11be standard. In the following description, for example, when no specific apparatus is designated, an access point and a station (terminal) will be sometimes called "AP" and "STA" without any reference numeral. FIG. 1 exemplifies a wireless communication network including one AP and three STAs, but the number of communication apparatuses may be larger or smaller than those shown in FIG. 1. For example, when STAs communicate with each other, no AP may be necessary. In FIG. 1, a circle 101 represents the communicable range of the network formed by the AP 102. Note that the communicable range may cover a wider range or only a narrower range.

The conventional IEEE 802.11ax standard adopts a dynamic allocation (to be also referred to as "DA") scheme of notifying a communication apparatus of allocation information every time a data frame is transmitted. In the IEEE 802.11be standard, however, an increase in the number of includable users is predicted, so the overhead may increase if a communication apparatus is notified of allocation information every time a data frame is transmitted, like the DA scheme. That is, frequency resources to be used are designated for many STAs, and information representing the allocation of the frequency resources becomes long. As a result, the time resource available for transmission/reception of data frames, and the throughput may decrease. To prevent this, application of a static allocation (to be also referred to as "SA") scheme is examined in the IEEE 802.11be standard as a method of allocating OFDMA frequency resources to a plurality of STAs. In the SA scheme, before transmitting a data frame, a STA is notified in advance of OFDMA allocation information and a corresponding identifier, and at the time of transmitting a data frame, only the identifier is designated. In this scheme, the allocation of frequency resources cannot be dynamically changed, but the overhead of allocation information can be reduced. It is assumed to selectively use the SA scheme and the DA scheme in accordance with a situation such as the number of STAs in a network.

Some STAs may not support the SA scheme. In this case, if the allocation of frequency resources based on the SA scheme is performed, a STA not supporting the SA scheme cannot interpret an identifier designated at the time of transmitting a data frame and cannot communicate. It is therefore important for the AP to recognize whether each STA supports the SA scheme. In the embodiment, information representing whether each STA supports the SA scheme is included as an information element (IE) of a MAC (Medium Access Control) frame in a radio signal transmitted by the STA. From this, the AP can clearly recognize whether each STA copes with the SA scheme, and properly select and execute a frequency resource allocation scheme. In the embodiment, the AP is notified by the MAC frame of whether the SA scheme is supported. However, the AP may be notified of information representing whether an allocation scheme for another radio resource (resource such as time, frequency, or space) is supported. Although the MAC frame includes the information in the embodiment, the AP may be notified of the information by a PHY (physical layer) header or the like. In the above description, the AP specifies whether each STA copes with the SA scheme, and allocates frequency resources. However, the STA may also have a similar frequency resource allocation function. For example, in communication between STAs, the STA may determine whether the other STA copes with the SA scheme and determine, based on the determination result, which of the SA scheme and the DA scheme is used.

(Apparatus Arrangement)

Figure 2:
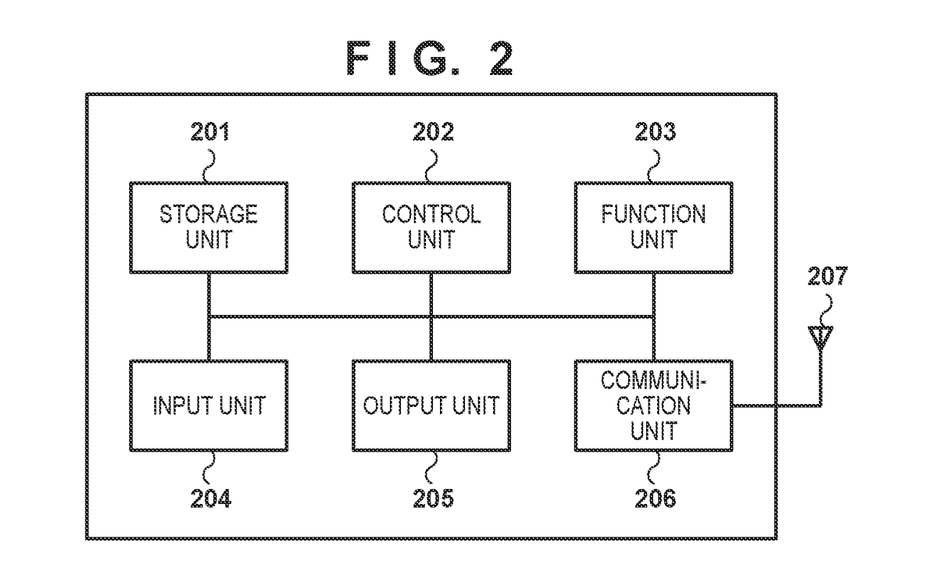
FIG. 2 is a block diagram showing an example of the hardware arrangement of a communication apparatus.

FIG. 2 shows an example of the hardware arrangement of a communication apparatus (AP and STA). The communication apparatus includes, as an example of the hardware arrangement, a storage unit 201, a control unit 202, a function unit 203, an input unit 204, an output unit 205, a communication unit 206, and an antenna 207.

The storage unit 201 is formed from both or either of a ROM (Read Only Memory) and a RAM (Random Access Memory), and stores various kinds of information such as programs for performing various operations (to be described later) and communication parameters for wireless communication. As the storage unit 201, a storage medium such as a flexible disk, a hard disk, an optical disk, a magneto-optical disk, a CD-ROM, a CD-R, a magnetic tape, a nonvolatile memory card, or a DVD may be used in addition to a memory such as a ROM or a RAM.

The control unit 202 is formed from, for example, one or more processors such as a CPU and a MPU, an ASIC (Application-Specific Integrated Circuit), a DSP (Digital Signal Processor), and a FPGA (Field Programmable Gate Array). The CPU is the acronym of a central processing unit, and the MPU is that of a micro processing unit. The control unit 202 controls the whole apparatus by executing programs stored in the storage unit 201. Note that the control unit 202 may control the whole apparatus by the cooperation between programs and an OS (Operating System) stored in the storage unit 201.

The control unit 202 controls the function unit 203 to execute predetermined processing such as image capturing, printing, or projection. The function unit 203 is hardware for executing predetermined processing by the apparatus. For example, when the communication apparatus is a camera, the function unit 203 is an image capturing unit and performs image capturing processing. For example, when the communication apparatus is a printer, the function unit 203 is a printing unit and performs printing processing. For example, when the communication apparatus is a projector, the function unit 203 is a projection unit and performs projection processing. Data to be processed by the function unit 203 may be data stored in the storage unit 201 or data communicated with another AP or STA via the communication unit 206 (to be described later).

The input unit 204 accepts various operations from the user. The output unit 205 performs various outputs to the user. The output by the output unit 205 includes at least one of display on the screen, audio output from the loudspeaker, vibration output, and the like. Note that both the input unit 204 and the output unit 205 may be implemented by one module, like a touch panel.

The communication unit 206 performs control of wireless communication compliant with the IEEE 802.11 standard series, and control of IP communication. The communication unit 206 is a so-called radio chip and may include one or more processors and memories. In the embodiment, the communication unit 206 can execute at least processing compliant with the IEEE 802.11be standard. The communication unit 206 controls the antenna 207 to transmit/receive a radio signal for wireless communication. The communication apparatus communicates contents such as image data, document data, and video data with another communication apparatus via the communication unit 206. The antenna 207 can perform transmission/reception in, for example, at least one of sub-GHz band, 2.4 GHz band, 5 GHz band, and 6 GHz band. Note that frequency bands (and a combination of them) compatible by the antenna 207 are not particularly limited. The antenna 207 may be one antenna or a set of two or more antennas for performing MIMO (Multi-Input and Multi-Output) transmission/reception. For example, the antenna 207 can be configured including 16 antenna elements in order to cope with MIMO communication using 16 spatial streams in the IEEE 802.11be standard.

Figure 3:
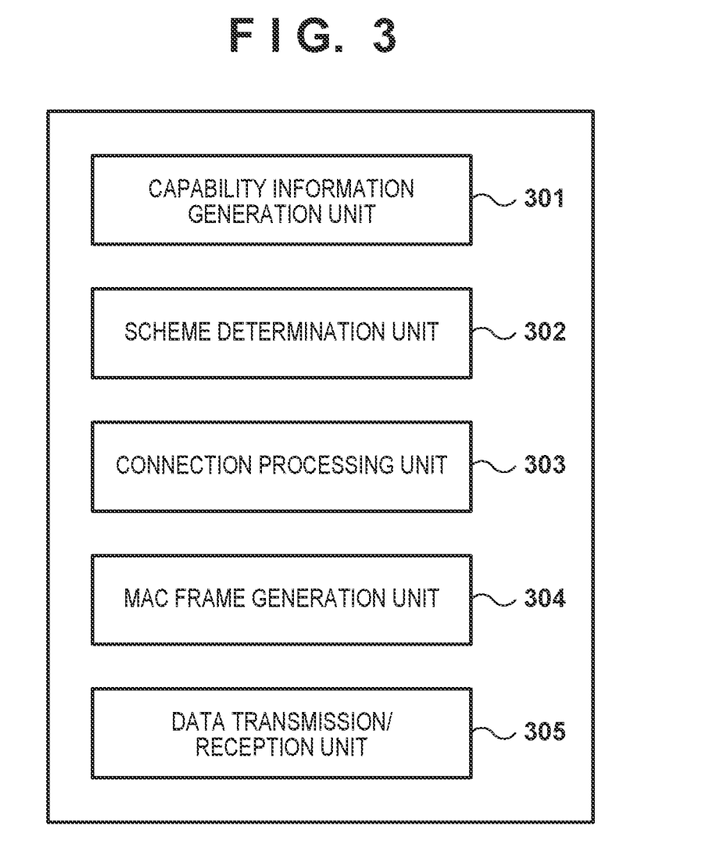
FIG. 3 is a block diagram showing an example of the functional arrangement of the communication apparatus.

FIG. 3 shows an example of the functional arrangement of the communication apparatus (AP and STA). The communication apparatus includes, as an example of the functional arrangement, a capability information generation unit 301, a scheme determination unit 302, a connection processing unit 303, a MAC frame generation unit 304, and a data transmission/reception unit 305. The capability information generation unit 301 generates capability information including information of an allocation scheme supported by the communication apparatus. The capability information includes information representing whether the communication apparatus can use the DA scheme or the SA scheme. Based on information of an allocation scheme supported by a communication partner apparatus, the scheme determination unit 302 determines an allocation scheme used for OFDMA communication with the partner. The connection processing unit 303 performs processing for connecting a STA to a network managed by an AP. The connection processing unit 303 of the STA transmits an association request frame to the AP, and the connection processing unit 303 of the AP transmits an association response frame as the response to the STA. The MAC frame generation unit 304 generates a MAC frame including the allocation scheme capability information generated by the capability information generation unit 301, as needed. Details of the allocation scheme capability information included in the MAC frame will be described later. Note that the allocation scheme capability information is included in the MAC header in the embodiment, but may be included in the payload. After that, addition of a PHY header and the like are performed on the generated MAC frame, generating a radio frame. The generated radio frame is a frame such as beacon, probe request/response, association request/response, or reassociation request/response. The data transmission/reception unit 305 performs at least either of transmission and reception of a data frame by OFDMA communication according to the allocation scheme determined by the scheme determination unit 302.

(Processing Sequence)

Next, an example of the sequence of processing executed by the communication apparatus according to the embodiment will be described. The sequence of processing till transmission/reception of a data frame after the AP receives a MAC frame including allocation scheme capability information from each STA will be explained. Here, the AP executes the following processing, but the STA may execute the following processing. The following processing is executed by, for example, executing a program stored in the storage unit 201 and controlling the communication unit 206 by the control unit 202 of the AP. However, the present invention is not limited to this, and the following processing may be executed by another arrangement.

Figure 4:
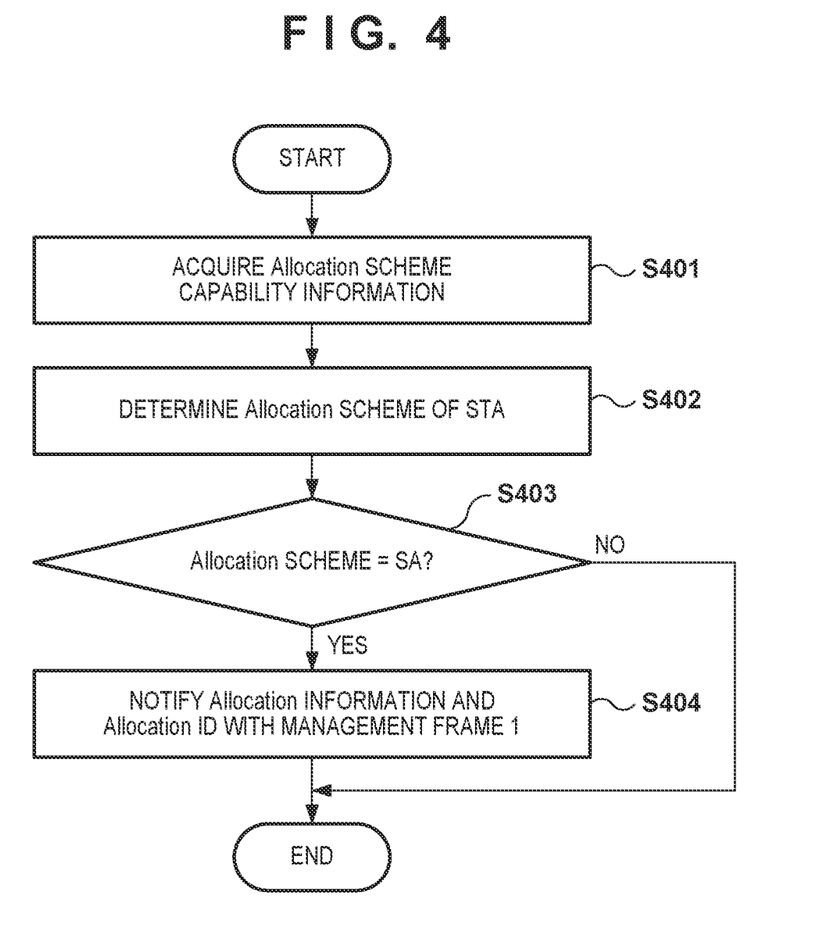
FIG. 4 is a flowchart showing an example of the sequence of processing by an AP at the time of connecting a STA.

FIG. 4 shows an example of the sequence of processing executed by the AP before performing data communication between the AP and the STA. In this processing, the AP acquires capability information from the STA, determines which of the SA scheme and the DA scheme is used, and when the SA scheme is used, notifies the STA of allocation information representing the allocation of a frequency resource and identification information of the allocation information. First, the AP acquires, from one or more STAs, pieces of allocation information of allocation schemes supported by the respective STAs serving as communication partner apparatuses (step S401). The AP can acquire capability information of an allocation scheme for each STA from, for example, a probe request frame transmitted from the STA to the AP before connection, or an association request frame transmitted at the time of connection.

The AP determines an allocation scheme to be used in communication with the STA based on the capability information of the allocation scheme of the STA acquired in step S401 (step S402).

For example, when the STA can use only the DA scheme, the AP determines to use the DA scheme. When the STA can use only the SA scheme, the AP can determine to use the SA scheme. That is, the AP can determine to use a scheme available in the STA. When there is a scheme unavailable in the AP, the AP determines to use a scheme available in both the AP and the STA. At this time, when there is no scheme common to a scheme available in the AP and a scheme available in the STA, the AP can avoid communication with the STA. In this case, the AP may neither accept, for example, an association request and reassociation request from the STA nor establish a connection. Also, when there is no scheme common to a scheme available in the AP and a scheme available in the STA, the AP can perform not OFDMA communication but CSMA/CA communication employed in standards before IEEE 802.11be.

When the STA can use both the DA scheme and the SA scheme, the AP may determine an allocation scheme based on information such as the communication characteristics of an application that uses data transmitted/received between the AP and the STA. For example, when the STA is a communication apparatus that periodically transmits a predetermined amount of data such as sensor data, it is assumed that a bandwidth and timing used are fixed, and the AP can select the SA scheme. When a frequency band (bandwidth) used by the application of the STA varies with time, the AP may select the DA scheme. Note that the STA can notify the AP of such information about the characteristics by a management frame defined by the IEEE 802.11 standard. When the number of communication partner STAs that communicate in parallel becomes equal to or larger than a predetermined value, the AP may select the SA scheme to reduce the overhead of allocation information. Note that the AP may determine to use different allocation schemes for respective STAs. For example, the SA scheme may be used for many STAs that transmit sensor data, in order to transmit data at once to these STAs, and the DA scheme may be used for STAs such as a smartphone capable of executing various applications in parallel. It is also possible to use, at a given timing, the SA scheme for some STA and the DA scheme for other STAs. In this case, a predetermined frequency resource can be allocated to the STAs that use the SA scheme, and a frequency resource not allocated in the SA scheme can be used for the STAs that use the DA scheme. These are merely examples, and flexible allocation scheme setting can be performed for each STA.

Then, the AP checks whether the allocation scheme determined in step S402 is the SA scheme (step S403). If the AP selects the SA scheme (YES in step S403), it transmits, to the STA, a management frame 1 including allocation information representing the allocation of the frequency resource to the STA, and an allocation ID for identifying the allocation information (step S404). When the STA receives the management frame 1, it stores the allocation information and the allocation ID in the storage unit 201 in association with each other. If the AP does not select the SA scheme (NO in step S403), it ends the processing in FIG. 4 without transmitting the management frame 1.

Figure 5:
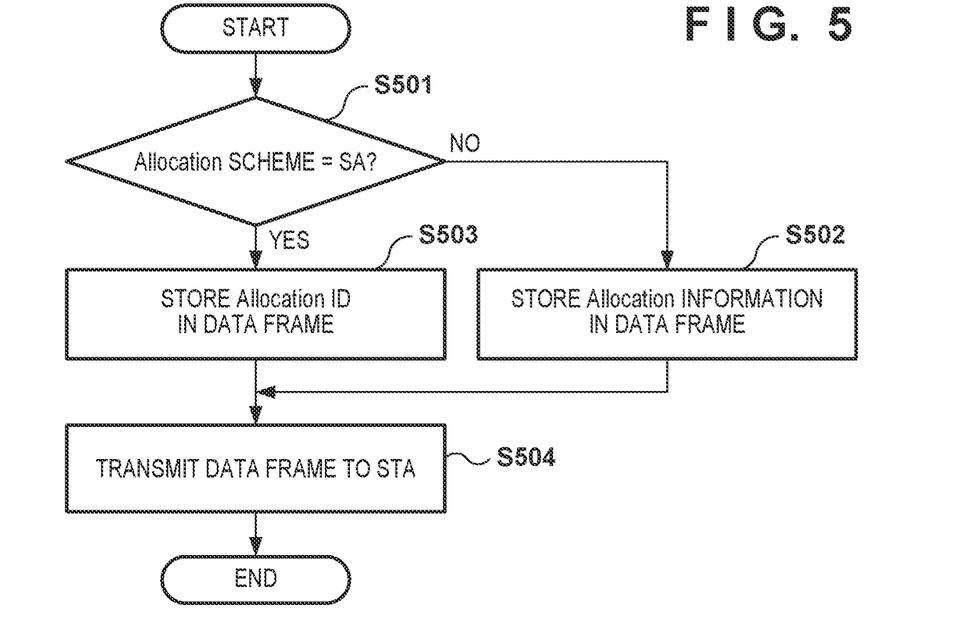
FIG. 5 is a flowchart showing an example of the sequence of processing by the AP at the time of downlink communication.

FIG. 5 shows an example of the sequence of processing by the AP at the time of downlink (DL)-OFDMA communication. Note that the downlink is a radio link in a direction in which a radio frame is transmitted from the AP to the STA. FIG. 5 shows processing when a data frame is transmitted from the AP to the STA.

In the processing of FIG. 5, first, the AP checks whether an allocation scheme used is the SA scheme (step S501). If the AP does not use the SA scheme for the STA (NO in step S501), that is, uses the DA scheme, it stores allocation information in the PHY header of a data frame addressed to the communication partner STA, similar to the IEEE 802.11ax standard (step S502). Then, the AP transmits the data frame to the STA (step S504). In this case, the STA can confirm the PHY header to specify a frequency resource allocated to the STA and receive the data frame in the frequency resource. To the contrary, if the AP uses the SA scheme for the communication partner STA (YES in step S501), it stores, in a data frame addressed to the STA, an allocation ID sent to the STA in step S404 of FIG. 4 (step S503). Then, the AP transmits the data frame to the STA (step S504). Note that the allocation ID may be stored in the PHY header or included in the MAC frame. In this case, the STA stores the allocation information and the allocation ID in association with each other, and can specify the allocation of the frequency resource based on allocation information corresponding to the designated allocation ID. The STA can receive data addressed to it in the allocated frequency resource.

Figure 6:
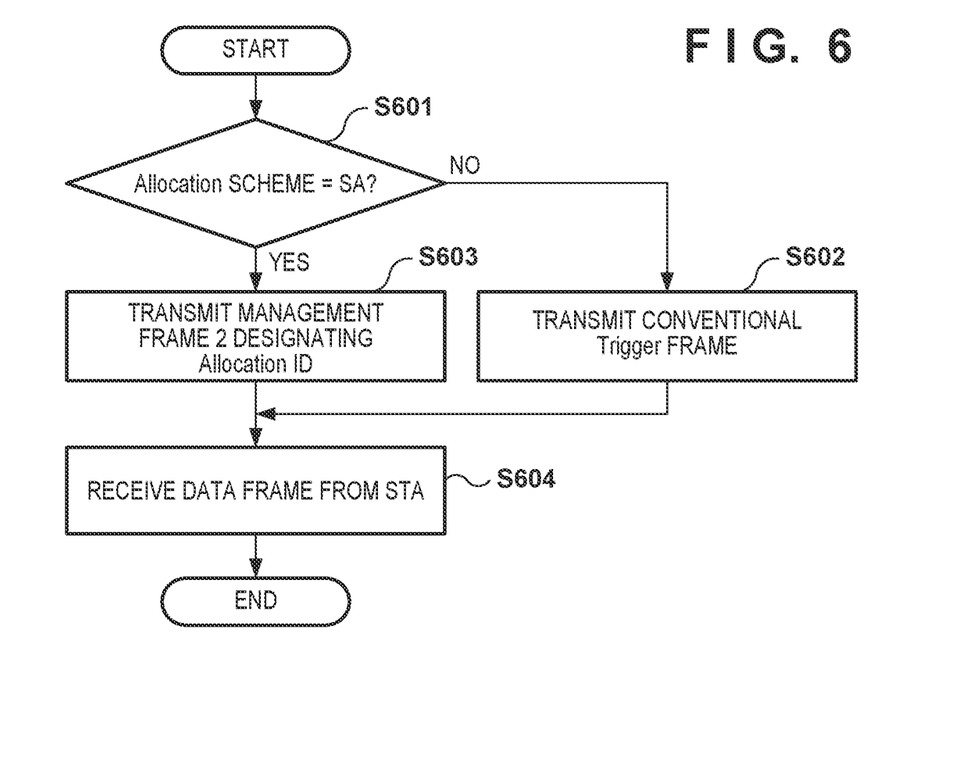
FIG. 6 is a flowchart showing an example of the sequence of processing executed by the AP at the time of uplink communication.

FIG. 6 shows the sequence of processing executed by the AP at the time of uplink (UL)-OFDMA communication. Note that the uplink is a radio link in a direction in which a radio frame is transmitted from the STA to the AP. FIG. 6 shows processing when a data frame is transmitted from the STA to the AP. Note that the processing in FIG. 6 can be performed in parallel for a plurality of STAs. It is also possible to set in advance a group of STAs that use the SA scheme, and execute the processing in FIG. 6 only once for the group at a timing when only the group of STAs communicate. In this case, a frequency resource is allocated to the plurality of STAs based on allocation information transmitted by the management frame 1, and the STAs are notified of a common allocation ID. A management frame 2 (to be described later) including the allocation ID is transmitted by multicasting to the STAs. In response to one transmission of the management frame, the STAs can communicate in parallel.

In the processing of FIG. 6, first, the AP checks whether an allocation scheme used for a communication partner STA is the SA scheme (step S601). If the AP does not use the SA scheme for the STA (NO in step S601), that is, uses the DA scheme, it transmits a trigger frame including allocation information to the STA, similar to the IEEE 802.11ax standard (step S602). Similar to the IEEE 802.11ax standard, the STA specifies an allocated frequency resource in accordance with the allocation information in the trigger frame, and transmits a radio frame using the frequency resource. In contrast, if the AP uses the SA scheme for the communication partner STA (YES in step S601), it transmits, to the STA, the management frame 2 designating an allocation ID sent to the STA in step S404 of FIG. 4 (step S603). In this case, the STA stores the allocation information and the allocation ID in association with each other, and can specify the allocation of the frequency resource based on allocation information corresponding to the designated allocation ID. The STA transmits a radio frame using the allocated frequency resource. The AP waits for the arrival of the radio frame in the frequency resource allocated to the STA, and receives the radio frame from the STA (step S604).

Figure 7:
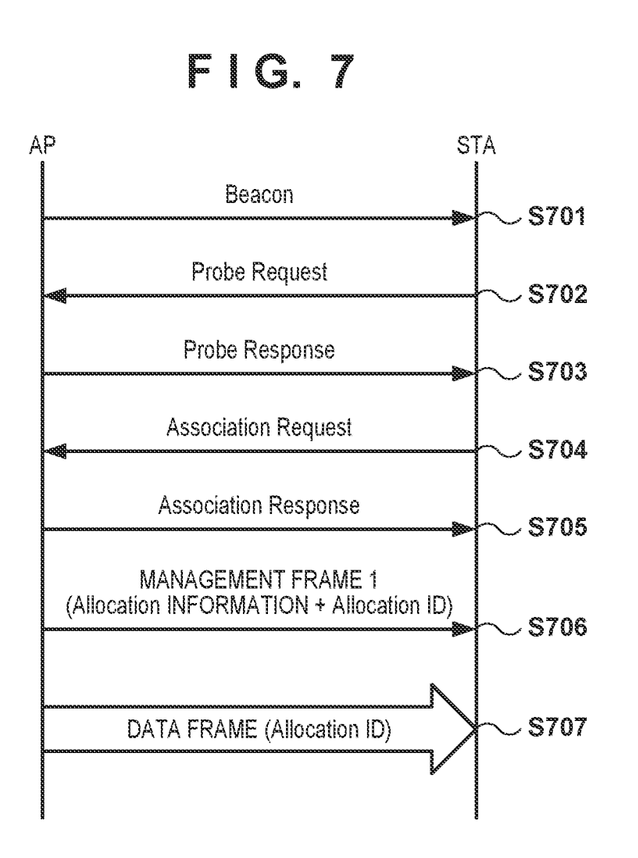
FIG. 7 is a chart showing an example of the sequence of communication in downlink communication when a SA scheme is used.

Next, an example of the sequence of communication when the SA scheme is used on the downlink will be described with reference to FIG. 7. First, the STA executes scan processing to acquire network information of the AP (S701 to S703). In the scan processing, the AP sends a beacon frame including network information, and STAs present around the AP detect and receive the beacon frame (S701). Each STA transmits a probe request frame to inquire network information of the AP (S702), and receives a probe response frame as the response from the AP (S703). Note that the STA may only passively acquire network information of the AP by receiving the beacon frame transmitted by the AP in S701, without executing the processes in S702 and S703. Regardless of the beacon frame, the STA may actively transmit a probe request frame in S702, receive a probe response frame from the AP, and acquire network information of the AP. The AP can store, in a beacon frame or a probe response frame, capability information representing an allocation scheme supported by the AP. Also, the STA can store, in a probe request frame, capability information representing an allocation scheme supported by the STA. By these processes, the STA and the AP can exchange capability information of the allocation scheme with each other.

After that, the STA transmits an association request frame for network connection (S704), and the AP transmits an association response frame representing the connection result of the STA (S705). Note that the STA may store capability information of the allocation scheme of the STA in the association request frame, and the AP may store capability information of the allocation scheme of the AP in the association response frame. Based on capability information of the allocation scheme of the AP acquired by the scan processing, the STA may determine capability information of an allocation scheme to be included in the association request frame. For example, when the STA can use both the SA scheme and the DA scheme but the AP can use only the DA scheme, the STA may store, in the association request frame, capability information representing that the STA can use only the DA scheme. Similarly, based on capability information of the allocation scheme of the STA acquired by the scan processing or the association request frame, the AP may determine capability information of an allocation scheme to be included in the association response frame.

Assume that the AP determines to perform allocation of a frequency resource by the SA scheme in communication with the STA. In this case, the AP transmits, to the STA, the management frame 1 including allocation information in DL-OFDMA and an allocation ID for identifying the allocation information (S706). The STA stores the allocation information and the allocation ID in association with each other. When transmitting a data frame (S707), the AP stores, in the PHY header of the data frame, an allocation ID corresponding to the allocation of the frequency resource in transmission, and transmits it to the STA.

Figure 8:
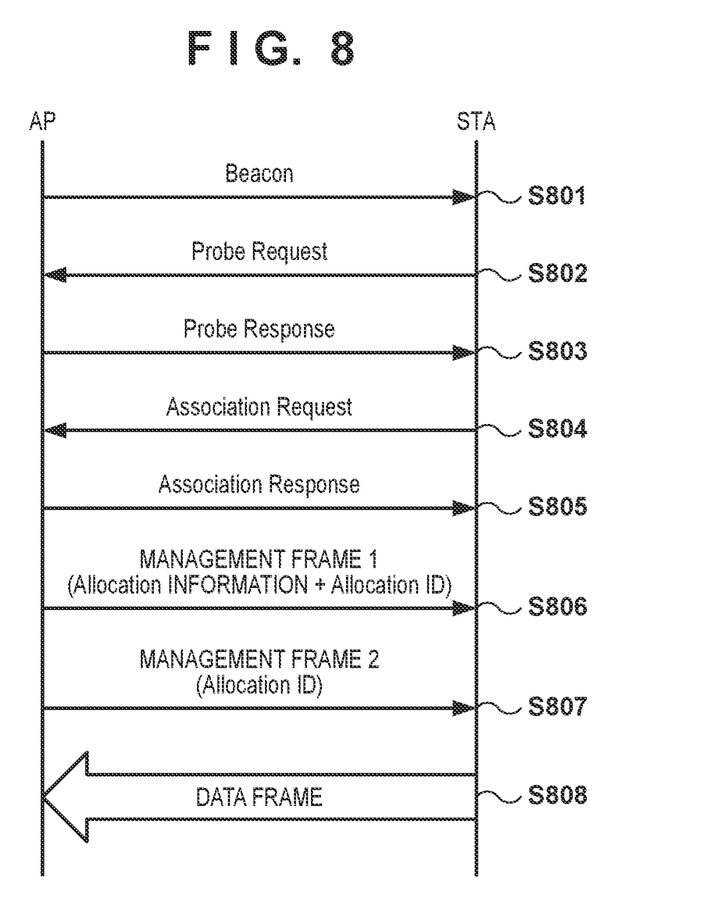
FIG. 8 is a chart showing an example of the sequence of communication in uplink communication when the SA scheme is used.

Next, an example of the sequence of communication when the SA scheme is used on the uplink will be described with reference to FIG. 8. In FIG. 8, processes in S801 to S805 are similar to those in S701 to S705 of FIG. 7, and a repetitive description thereof will be omitted. Assume that the AP determines to perform allocation of a frequency resource by the SA scheme in communication with the STA. In this case, the AP transmits, to the STA, the management frame 1 including allocation information in UL-OFDMA and an allocation ID for identifying the allocation information (S806). The STA stores the allocation information and the allocation ID in association with each other. To start transmission of a data frame in UL-OFDMA to the STA, the AP transmits the management frame 2 including an allocation ID to the STA (S807). The STA specifies corresponding allocation information based on the allocation ID, and transmits a data frame to the AP in a frequency resource designated based on the allocation information (S808).

When the DA scheme is used on the uplink and the downlink, communication is performed by a method defined in IEEE 802.11ax, a description of which will be omitted. Note that the same allocation scheme may be used on the uplink and the downlink, or different allocation schemes may be used. For example, when many sensors periodically transmit environment detection results to the AP, the communication frequency on the uplink is assumed to be high. In contrast, the frequency at which data is transmitted to these sensors is assumed to be low. Thus, the SA scheme may be used on the uplink and the DA scheme may be used on the downlink.

(Configuration of Capability Information of Allocation Scheme)

Figure 9:
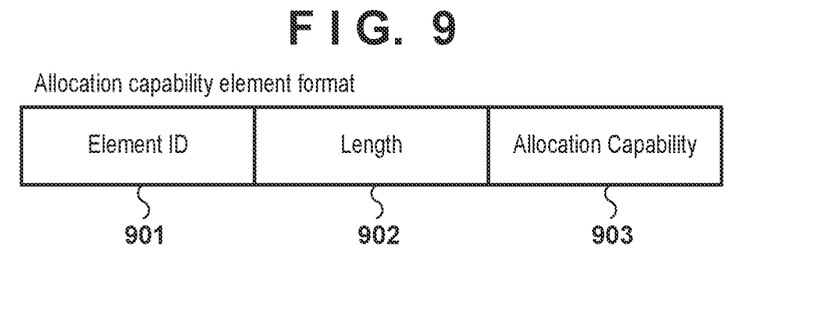
FIG. 9 is a view showing an example of capability information about the allocation scheme.

Next, an example of the configuration of capability information (allocation capability element) of the allocation scheme will be described with reference to FIG. 9. The allocation capability element has a configuration similar to that of another information element defined in the IEEE 802.11 standard. That is, the capability information has a format including an element ID field 901, a length field 902, and a capability information-specific information field 903. The capability information is added to the MAC frame of a frame such as beacon, probe request/response, association request/response, or reassociation request/response.

Figure 10:
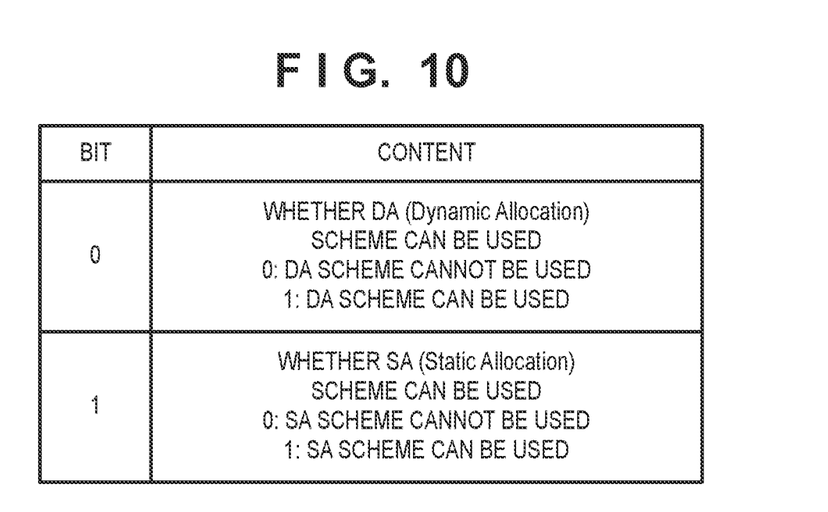
FIG. 10 is a table showing an example of information stored in the capability information.

Identification information for identifying the capability information is stored in the element ID field 901. A value representing the total length of the capability information is stored in the length field 902. Information of a capability (allocation capability) representing whether an allocation scheme can be used is stored in the information field 903. FIG. 10 shows an example of the information stored in the information field 903. FIG. 10 shows an example when the allocation capability is represented by 2-bit information. The first bit (bit 0) represents whether the DA scheme can be used. When this bit value is "0", it represents that the transmission source apparatus cannot use the DA scheme. When this bit value is "1", it represents that the apparatus can use the DA scheme. Similarly, the second bit (bit 1) represents whether the SA scheme can be used. When this bit value is "0", it represents that the transmission source apparatus cannot use the SA scheme. When this bit value is "1", it represents that the apparatus can use the SA scheme.

Note that the above-described configuration is merely an example, the names of the fields and the positions and sizes of bits are not limited to this example, and similar information may be stored with different field names, in a different order, or at different sizes. For example, whether the two allocation schemes (DA scheme and SA scheme) can be used is represented by the 2-bit field in FIG. 10, but the present invention is not limited to this. For example, the number of bits of the field may be, for example, three or more, and this field may represent whether another allocation scheme can be used. The DA scheme and the SA scheme are merely examples of the allocation scheme, and another scheme may be employed instead of them.

As described above, according to the embodiment, a communication apparatus can notify a partner apparatus using the MAC frame structure, of information of a frequency resource allocation scheme supported (available) by the communication apparatus. The allocation of a frequency resource to be used for communication of each communication apparatus can be flexibly executed based on a scheme supported by the communication apparatus. Note that capability information representing whether an allocation scheme can be used is transmitted by the MAC frame in the above-described example, but may be included in another part within a radio frame, such as a PHY preamble. Note that the present invention can also be implemented by an information processing apparatus (for example, a radio chip) that generates the MAC frame, in addition to the AP 102 and the STAs 103 to 105 that are communication apparatuses.

According to the present invention, a plurality of methods for allocating frequency resources can be efficiently used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more memories that store a set of instructions; and
at least one processing circuit, wherein the communication apparatus is caused, by the at least one processing circuit executing the instructions and/or the at least one processing circuit itself operating, to perform operations comprising:

receiving a first radio frame compliant with the IEEE 802.11 standard series from a partner apparatus in communication, wherein capability information representing an allocation scheme of a frequency resource used for OFDMA (Orthogonal Frequency Division Multiple Access) supported by the partner apparatus is indicated in a MAC (Medium Access Control) frame of the first radio frame, wherein the capability information of the communication apparatus that is to be included in a second radio frame to be transmitted to the partner apparatus is determined based on the capability information of the partner apparatus included in the first radio frame received from the partner apparatus, and wherein the capability information in the second radio frame includes information representing whether the communication apparatus that has transmitted the second radio frame supports a static allocation scheme in which the communication apparatus is notified of allocation of the frequency resource together with a corresponding identifier and the allocation of the frequency resource is designated by the corresponding identifier when transmitting a data frame.

2. The communication apparatus according to claim 1, wherein the capability information in the second radio frame includes information representing whether the communication apparatus that has transmitted the second radio frame supports a direct allocation scheme in which the communication apparatus is notified of allocation of the frequency resource every time a data frame is transmitted.

3. The communication apparatus according to claim 1, the operations further comprising determining, based on the capability information of the communication apparatus and the capability information of the partner communication apparatus, an allocation scheme of the frequency resource used to transmit/receive a data frame to/from the partner apparatus.

4. The communication apparatus according to claim 3, wherein in the determining, as the allocation scheme of the frequency resource used to transmit/receive the data frame to/from the partner apparatus, an allocation scheme of the frequency resource that can be used in both the communication apparatus and the partner apparatus is determined.

5. The communication apparatus according to claim 3, in the determining, further based on the number of partner apparatuses that communicate in parallel, the allocation scheme of the frequency resource used to transmit/receive the data frame to/from the partner apparatus is determined.

6. The communication apparatus according to claim 3, wherein in the determining, based on a communication characteristic of an application that uses data transmitted/received to/from the partner apparatus, the allocation scheme of the frequency resource used to transmit/receive the data frame to/from the partner apparatus is determined.

7. The communication apparatus according to claim 1, wherein the MAC frame in one of a beacon frame, a probe request frame, a probe response frame, an association request frame, an association response frame, a reassociation request frame, and a reassociation response frame represents the capability information of the communication apparatus that has transmitted the second radio frame.

8. The communication apparatus according to claim 1, the operations further comprising:

transmitting the second radio frame to the partner apparatus, wherein the allocation scheme to be used between the communication apparatus and the partner apparatus is determined, by the partner apparatus, based on the capability information of the communication apparatus included in the second radio frame.

9. A control method executed by a communication apparatus, comprising:

receiving a first radio frame compliant with the IEEE 802.11 standard series from a partner apparatus in communication, wherein capability information representing an allocation scheme of a frequency resource used for OFDMA (Orthogonal Frequency Division Multiple Access) supported by the partner apparatus is indicated in a MAC (Medium Access Control) frame of the first radio frame; and transmitting a second radio frame to the partner apparatus, wherein the capability information of the communication apparatus that is to be included in the second radio frame to be transmitted to the partner apparatus is determined based on the capability information of the partner apparatus included in the first radio frame received from the partner apparatus, and wherein the capability information in the second radio frame includes information representing whether the communication apparatus that has transmitted the second radio frame supports a static allocation scheme in which the communication apparatus is notified of allocation of the frequency resource together with a corresponding identifier and the allocation of the frequency resource is designated by the corresponding identifier when transmitting a data frame.

10. A non-transitory computer-readable storage medium that stores a program for causing a computer included in a communication apparatus to:

receive a first radio frame compliant with the IEEE 802.11 standard series from a partner apparatus in communication, wherein capability information representing an allocation scheme of a frequency resource used for OFDMA (Orthogonal Frequency Division Multiple Access) supported by the partner apparatus is indicated in a MAC (Medium Access Control) frame of the first radio frame; and transmit a second radio frame to the partner apparatus, wherein the capability information of the communication apparatus that is to be included in the second radio frame to be transmitted to the partner apparatus is determined based on the capability information of the partner apparatus included in the first radio frame received from the partner apparatus, and wherein the capability information in the second radio frame includes information representing whether the communication apparatus that has transmitted the second radio frame supports a static allocation scheme in which the communication apparatus is notified of allocation of the frequency resource together with a corresponding identifier and the allocation of the frequency resource is designated by the corresponding identifier when transmitting a data frame.

* * * * *